Feb. 7, 1961　　　D. E. CAIN　　　2,970,680
TORQUE LIMITING CENTRIFUGAL CLUTCH
Filed Feb. 7, 1958　　　2 Sheets-Sheet 1

Inventor
Dallas E. Cain
by Merton D Moore
His Attorney

Feb. 7, 1961
D. E. CAIN
2,970,680
TORQUE LIMITING CENTRIFUGAL CLUTCH
Filed Feb. 7, 1958
2 Sheets-Sheet 2
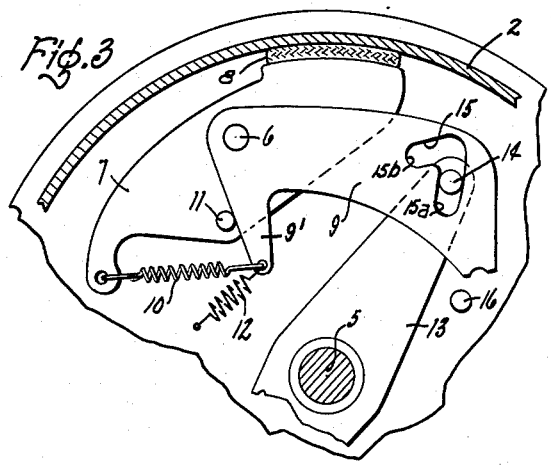
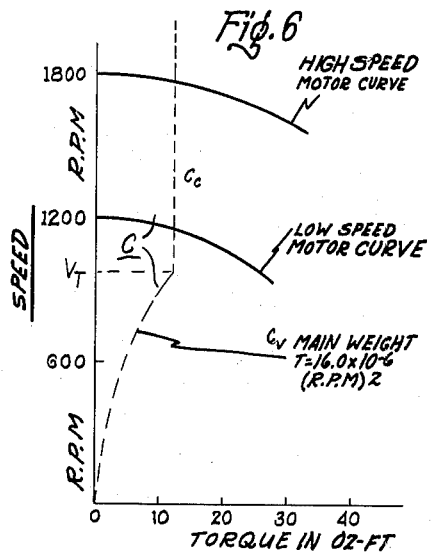
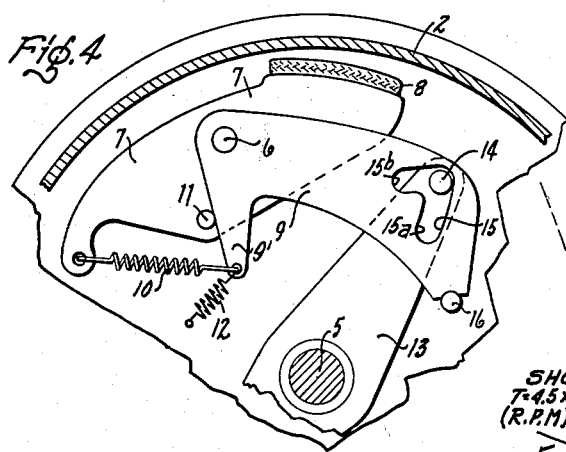
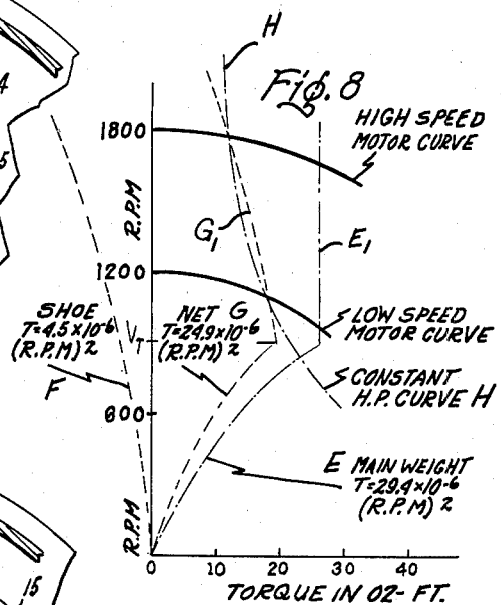
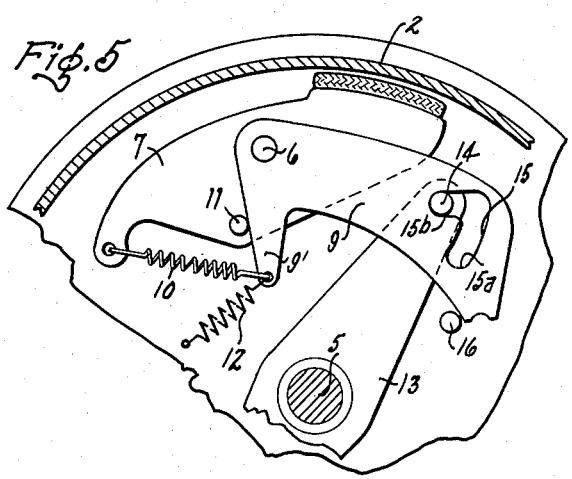
Inventor
Dallas E. Cain
by Merton D. Morse
His Attorney

United States Patent Office 2,970,680
Patented Feb. 7, 1961

2,970,680
TORQUE LIMITING CENTRIFUGAL CLUTCH

Dallas E. Cain, Scotia, N.Y., assignor to General Electric Company, a corporation of New York Filed Feb. 7, 1958, Ser. No. 713,950

2 Claims. (Cl. 192—105)

This invention relates to a torque limiting slip clutch and, more particularly, to a clutch adapted for use in automatic washers designed to have two-speed spin cycles.

Present day automatic washers spin-dry clothes at one stage of their operation by rotating the clothes containing basket at high speed. To facilitate bringing the basket up to speed during the spin operation without overloading the driving motor, a clutch is customarily provided which limits the load torque seen by the motor during acceleration from standstill to running speed. After the basket comes up to speed, the clutch operates without slippage during the remaining portion of the spin cycle.

Hitherto such clutches have been of the centrifugal type wherein friction surfaces engage the load and are maintained in contact by the centrifugal force exerted by weighted levers. The torque transmitted by such clutches is a function of speed since the force exerted on the levers and transferred to the friction surfaces is derived from centrifugal force which varies as the square of the speed, and hence the motor starts under no load and accelerates quickly to running speed, resulting in minimum start winding duty.

In the past such clutches have been adequate since single spin speeds were utilized and the clutches were designed to provide optimum performance at this speed. However, with the increasing diversity of materials and fabrics to be dried, both natural and synthetic, it has been found that one spin speed cannot always produce optimum drying, hence, it is desirable to provide two spin speeds from which to choose depending on the fabric. For certain synthetic fibers, such as nylon for example, it has been found that to produce the best results the spin speed should be approximately two-thirds of that for the more common fabrics such as cotton or wool. Present clutches used with a two-speed motor introduce serious complications since such centrifugal clutches at reduced speed deliver greatly reduced torque resulting in the acceleration time to the reduced speed being actually longer than for the high speed. Operating at two-thirds (⅔) speed the torque delivered by a centrifugal clutch is decreased to 41% and the basket acceleration time is increased to approximately 157% of that at the higher speed.

It is desirable, then, in order to make better use of motor capacity and to reduce basket acceleration time at the lower speed, to utilize a torque limiting clutch which delivers constant torque at both operating speeds or, in some circumstances in fact, to provide an inverse torque-speed relationship so that the clutch delivers equal horsepower at the two operating speeds.

One object of this invention, therefore, is to provide a clutch assembly adapted to be used efficiently for a multi-speed operation.

Another object of this invention is to provide a clutch assembly to be used with a two-speed motor without increasing the load acceleration time at the low speed.

An additional object of this invention is to provide a clutch to be used with a two-speed motor which transmits proper torque at the low speed.

A further object of this invention is to provide a torque limiting clutch to be utilized with a two-speed motor which clutch delivers constant slip torque at both operating speeds.

Yet another object of this invention is to provide a torque limiting clutch assembly which delivers equal horsepower at two operating speeds.

A still further object of this invention is to provide a torque limiting clutch for a two-speed spin cycle automatic washer, which clutch is locked against movement during the washing operation.

Other objects and advantages of this invention will become apparent as the description of the invention proceeds.

To achieve the above objects a clutch is provided which includes a load engaging and a weighted member rotatably mounted on a shaft driven from a two-speed motor. A resilient tension spring connected between the two members normally maintains them in engagement so that they function as a single element whereby centrifugal force acting on the weighted member causes both to rotate so that the load is engaged transmitting torque proportional to the square of the speed. At a given "throw-out" speed, the centrifugal force overcomes the spring tension disengaging the weighted member from the load engaging member which is henceforth urged against the load by the spring tension. Thus, increases of speed above the "throw-out" speed no longer affect the load engaging member and the torque supplied to the load remains constant.

In an alternative construction, constant horsepower rather than constant torque is delivered by the clutch and, consequently, the torque at the higher spin speed is less than that delivered at the lower speed. By counterweighting the load engaging member the centrifugal force acting thereon opposes that of the weighted member so that as speed increases above "throw-out" the centrifugal force acting on the load engaging member opposes the spring force and decreases the delivered torque.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawings in which:

Figures 3–5 are fragmentary showings of the clutch of Figure 1; Figure 5 illustrating the positive locking arrangement of the clutch during the washing operation;

Figure 6 is a graph of torque vs. speed demonstrating the operation of the clutch as a constant torque clutch;

Figure 8 is a graph of torque vs. speed illustrating the operation of the equal horsepower clutch of Figure 5.

Figure 1:
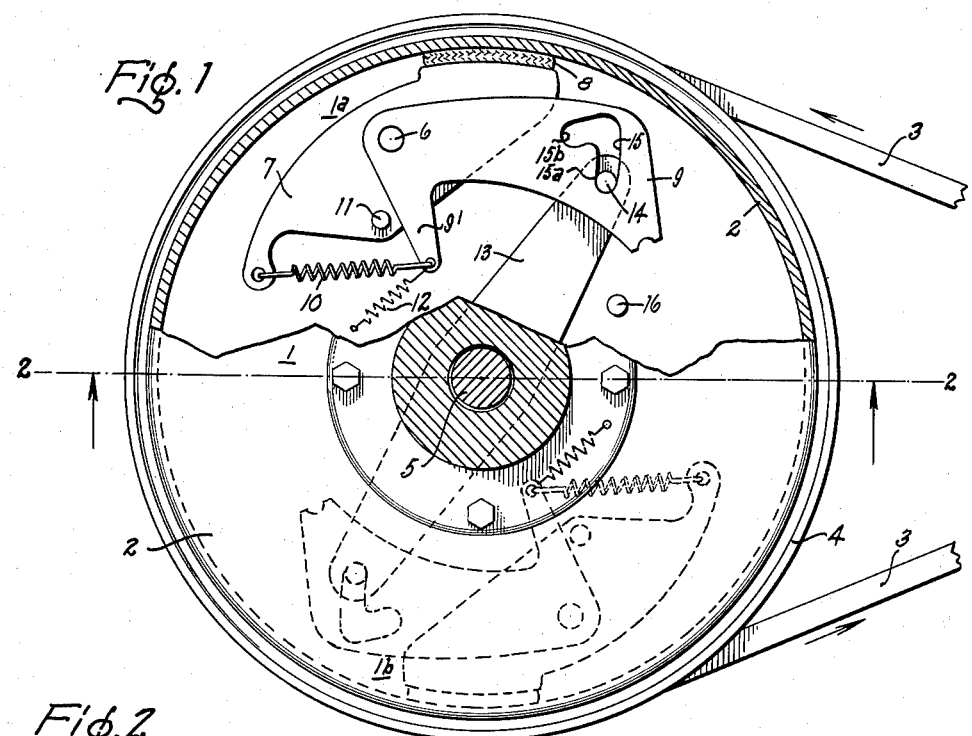
Figure 1 is a plan view, partially broken away, of the clutch assembly embodying the invention.
Figure 2:
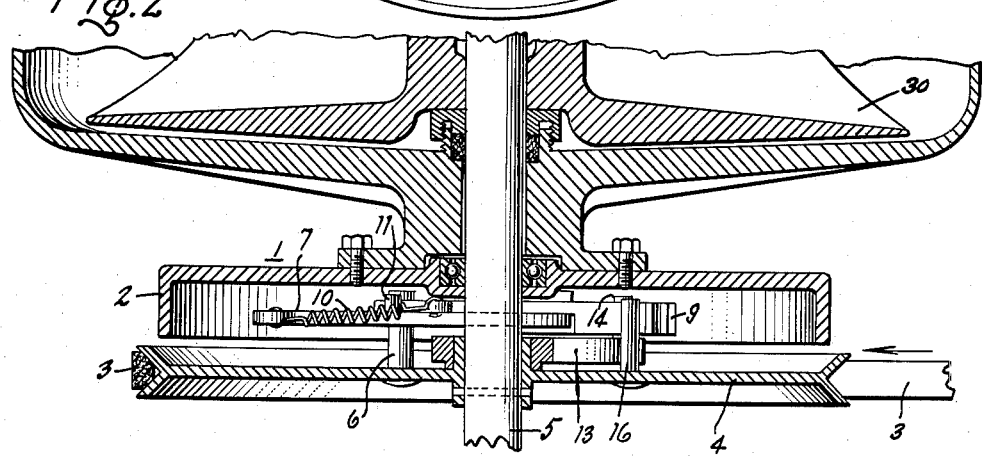
Figure 2 is a sectional view of the clutch taken along the lines 2—2 of Figure 1.

Referring now to Figures 1 and 2 there is illustrated a clutch embodying the invention which couples a multi-speed source to a load in a manner such that the torque delivered to the load increases with speed over a predetermined range but does not increase with increases in speed beyond this range. To accomplish the foregoing, there is provided a clutch assembly indicated generally at 1 which couples a basket supporting driven member or drum 2 to a two-speed driving source; for example, a multi-speed A.C. motor, not illustrated, which is selectively operated at two different speeds in any suitable manner. A belt 3 coupled to the motor drives the clutch assembly 1 through the medium of a pulley web 4 mounted on a shaft 5 (seen most clearly in Figure 2). A washing device such as the impeller or agitator 30 is secured to shaft 5 for rotation therewith.

The clutch assembly 1 which is coupled to and driven from the pulley 4 is constituted of a pair of identical clutches 1$a$ and 1$b$ so positioned as to engage the inner surface of the drum 2 at two points to provide balanced operation. Since the clutches are identical in construction and operation, but one of these will be adverted to in the following description. A pulley driving pin 6 projecting from the web or spoke of pulley 4 has a balanced load engaging clutch member or shoe 7 and an L-shaped weighted member 9 rotatably mounted thereon. The clutch member 9, upon rotation of the pin 6 about the axis of pulley 4, is subject to centrifugal force tending to rotate it counter-clockwise about the axis of pin 6 throwing its right end portion outward. The member 9, in a manner presently to be described, applies force to the member 7 rotating it about pin 6 urging a friction pad 8 carried on member 7 against the drum 2 to transmit torque to the load, which torque varies with speed over a predetermined range.

A selective coupling means between the members 9 and 7 maintains the arm portion 9' of member 9 in engagement with a pin 11 carried by member 7 until the speed of rotation reaches a critical point at which time the two members are disengaged. To this end a high force, low gradient tension spring member 10 is connected between members 7 and arm portion 9' and, during standstill and speeds below a predetermined value, urges the arm portion 9' against a pin or stop 11 projecting from the member 7 so that they act and move as a unitary structure. A light centering spring 12 fastened to the arm 9' spring biases the members toward the center of the clutch away from the drum disengaging clutch member 7 from the drum during standstill.

The operation of the clutch may be described as follows. At standstill the clutch shoe member 7 is spring biased toward the center of the clutch by the spring 12 so that the friction pad 8 does not contact the drum. At the initiation of the spin cycle, as the pulley 4 and the pin 6 begin to rotate in a counter-clockwise direction, the centrifugal force acting on the weighted member 9 rotates it counter-clockwise about the axis of pin 6 and outwardly towards the drum. Since the weighted member 9 and the load engaging member 7 are coupled by the high force, low gradient tension spring 10, the arm portion 9' bears against the stop 11 on the shoe member 7 and rotation of member 9 rotates member 7 until the friction pad member 8 bears on the drum 2.

As speed increases, the centrifugal force acting on the member 9, and hence the friction pad 8 on the shoe 7, increases as the square of the speed, as is well known to those familiar with centrifugal clutches. At a predetermined or "throw-out" speed, which is a function of such parameters as the spring force of spring 10 and the mass of the weighted member 9, the centrifugal force acting on member 9 overcomes the tension of the spring 10 rotating member 9 and out of contact with the pin 11. Thus, the two members 9 and 7 no longer function as a unitary structure and thereafter the load torque is maintained constant by the spring tension of the spring member 10. Thus, for further increases in speed, the load torque is constant and controlled only by the spring gradient of the spring 10.

Figure 6 illustrates graphically the torque vs. speed relationship described above of a clutch embodying the instant invention. In the graph of Figure 6 torque in ounce-ft. is plotted along the abscissa and speed in revolutions per minutes along the ordinate. The two solid line curves bearing the legends High Speed Motor Curve and Low Speed Motor Curve, respectively, represent the characteristic torque vs. speed operational curves for a multi-speed A.C. driving motor which is selectively operated at two different speeds by switching from 6 pole to 4 pole operation, for example. The dashed curve C represents the torque vs. speed operating characteristic of the clutch of Figure 1 and is constituted of two portions $C_v$ and $C_c$. Thus, it is apparent that from standstill to a critical "throw-out" speed $V_t$, as described above, the torque transmitted by the clutch varies as the square of the speed for a given mass and radius of the member 9 as illustrated by portion $C_v$ of the curve which bears the legend Main Weight $T = 16.0 \times 10^{-6}$ (R.P.M.)$^2$. Beyond the "throw-out" speed $V_t$, the delivered torque is constant, representing only the spring tension of spring 10 and is denominated $C_c$. Hence, the curves of Figure 6 clearly show the two stage operational characteristics of the instant invention; i.e., torque varying with speed and constant torque.

To limit travel of the member 9 after disengagement from the pin 11 and to lock it during the washing portion of the washer cycle, a freely rotatable yoke 13 mounted on the pulley supporting stub shaft 5 has a vertically extending pin 14 projecting therefrom and extending through an L-shaped slot 15 comprising legs 15$a$ and 15$b$ in the arm 9. The pin 14 rides in leg 15$a$ of the slot 15 during counter-clockwise rotation of the clutch to permit outward movement of the weighted member 9 until the pin 14 reaches the end of the slot preventing further movement, a condition illustrated in Figure 1.

The other leg 15$b$ of the L-shaped slot functions to lock the entire assembly against movement during the agitate stage of the washer operation when the direction of rotation of pulley 4 is reversed. The precise manner in which this is accomplished will be explained in detail later with reference to Figures 3–5. Suffice it to say at this time, however, that the slot portion 15$b$ locks the clutch assembly and the load engaging shoe member 7 away from the drum during the reversal of rotation. A pin 16 fastened to the pulley web 4 provides a stop for the member 9 when it is in the neutral position.

To make certain rapid transition from load torque which varies with speed to constant torque, the spring force gradient (G) with changing elongation of the spring member 10 should be larger than the centrifugal force gradient on the weighted member 9 with changes in radius. If the centrifugal force gradient is larger than the spring force gradient of the spring 10 with changing elongation, a sharp transition between the speed dependent torque and the constant torque, as illustrated in Figure 6, is not possible. Hence, in order to insure this sharp transition it is desirable that spring force gradient be larger than the centrifugal force gradient with the changing radius.

As has been adverted to briefly above, the clothes washing part of the operational cycle of an automatic washer comprises the agitation of the clothes by an impeller 30 within the basket, seen most clearly in Figure 2. It also becomes immediately apparent that during this agitation operation the clutch assembly must be immobilized since it is desirable that the clothes containing basket remain stationary during this operation. The slot 15, referred to briefly with reference to Figure 1, performs this locking function in addition to limiting the outward movement of the weighted member 9.

Figure 3 illustrates the condition as the drive motor, not shown, slows down to a stop, centrifugal force on the weighted member 9 is reduced returning it toward the center of the clutch and the pin 14 rides along leg 15$a$ towards the neutral position at the junction of the legs of the L-shaped slot 15. At this point the friction pad 8 on the load engaging member 7 is still in engagement with the drum although the torque transmitted drops with the reduction in speed.

As the drive motor for the clutch assembly comes to a halt the member 9 no longer has any centrifugal force acting on it and returns to its neutral position against the stop 16. At this point, illustrated in Figure 4, the effect of the centering spring 12 is such that the members 7 and 9 are spring biased towards the center of the clutch away from the drum and the friction pad member 8 is disengaged from the drum.

Should the driving motor now start in the reverse direction (i.e., clockwise movement), the inertia of the yoke 13 is such that the pin 14 extending through the slot 15 moves along leg 15b, as illustrated in Figure 5, thus locking the whole clutch assembly out of action. That is, the centrifugal force acting against the member 9 due to the clockwise rotation of the motor and drive pin 6 is ineffective to rotate member 9 outward towards the drum inasmuch as the pin 14 acting against the side walls of the leg 15b restrain outward movement. Hence, since the member 9 is prevented from moving outwardly so is the friction pad 8 on the shoe member 7. Hence, no torque is transmitted to the drum 2 maintaining the whole assembly in the locked-out position during reverse rotation.

As the cycle is repeated and the drive motor once again begins to run in the counter-clockwise rotation the pin 14 moves along leg 15b to the neutral position and thence down the leg 15a of the slot 15 permitting outward movement if the proper direction of rotation is maintained.

In the clutch assembly described with reference to Figures 1-6, the clutch transmits constant torque at the two operational speeds of the system. However, in many instances, for example when it is desired to accelerate faster at the low speed operation or where better utilization of the motor capacity is desired, the need is for equal horsepower at the two operating speeds rather than constant torque. It is easily apparent that if equal horsepower is desired an inverse torque vs. speed characteristic must be provided. Hence, it becomes necessary to provide a means which has an inverse torque-speed characteristic in the desired operational range.

Figure 7:
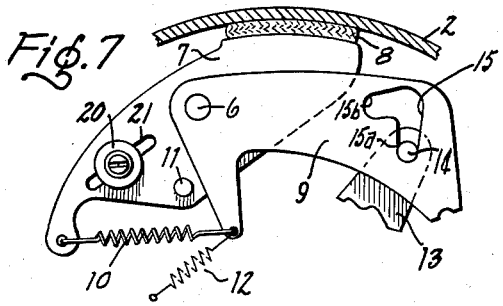
Figure 7 is a showing of an alternative embodiment of the clutch which provides equal horsepower at the two operational speeds.

Figure 7 shows a modification of the clutch assembly of Figure 1 which is so constructed as to transmit equal horsepower at the two operating speeds. In Figure 7 a counter-weight 20 is adjustably positioned in a slot 21 on the shoe member 7 whereby centrifugal force acting on the shoe member 7 tends to rotate it in a clockwise direction so as to urge the member 7 and the friction pad 8 out of engagement with the load. All other elements in Figure 7 which correspond to elements shown in Figures 1 and 2 are designated by like reference numerals. Thus, the load engaging and weighted members 7 and 9 mounted on the pulley drive pin 6 are both affected by centrifugal force; the one (member 9) tending to urge the friction pad 8 into engagement with the drum 2, and the other (member 7) tending to urge the friction pad out of engagement with the drum.

The relative weights and the centers of gravity of these weights of the two members are so proportioned that the effect of the member 9 is preponderant and overrides that due to the counter-weight 20 on the shoe 7. Hence, as long as the spring 10 maintains the member 9 in engagement with the pin 11 and the two members act as a unitary element, the centrifugal force acting on the arm 9 overrides that of the counter-weight 20 and the member 7 and its friction pad 8 are urged into contact with the drum 2, applying torque thereto which increases with speed. However, as the speed increases to the critical "throw-out" speed, the centrifugal force acting on the arm 8 overcomes the tension of the spring 10 and, as has been explained in detail with reference to Figure 1, the arm 9 is disengaged from pin 11 eliminating the effects of this centrifugal force from the shoe member 7.

The constant force due to the spring member 10 now urges the shoe 7 into engagement with the drum 2. However, centrifugal force acting on the shoe 7 due to the counter-weight 20 opposes the force due to the spring 10 and as a result with increases of speed the torque supplied to the load is progressively reduced, the actual torque at any given speed being equal to the difference between the constant torque due to the spring element 10 and the varying centrifugal force due to the counter-weight 20. The counter-weight 20 is so proportioned that the effect of the centrifugal force acting thereon through the two desired operational speeds is less than that of the spring force and, hence, a progressive reduction thereof is provided.

It is apparent that the centrifugal force due to the counter-weight 20 may be varied by changing its position in the slot or by changing its magnitude, or both. Thus, by changing these parameters the shape of the inverse speed-torque characteristic curve in the desired operational range may be varied to fit the circumstances.

Figure 8 illustrates graphically the operation of the constant horsepower clutch of Figure 7. In Figure 8 once more the torque in ounce-ft. is plotted along the abscissa and the speed in revolutions per minute along the ordinate. The curve E denominated by the legend Main Weight represents the variations in load torque due to the effect of centrifugal force on the main weighted member 9 for a given set of parameters, while the curve F, bearing the legend Shoe, represents the effects of centrifugal force on the counter-weight 20 on the shoe member 7. As can be seen, the two curves subtract to produce the resultant curve G, bearing the legend Net, representing the net differences between the curves E and F. At the critical "throw-out" speed (at approximately 1000 r.p.m.) the member 9 is disengaged from the assembly and with further increases in speed the resultant torque applied to the load is the difference between the constant force due to the spring member 10, and denominated as portion $E_1$ of curve E, and the effects of centrifugal force acting on the counter-weight 20. As a consequence, with increases in speed above the "throw-out" speed $V_t$ the net torque applied to the load, as shown by portion $G_1$ of curve G, follows the general configuration of the curve F and, hence, at the higher operating speed the torque is less than that at the lower operating speed.

Also superimposed on this graph is a curve H which represents a constant horsepower curve over the desired range. As can be seen the net resultant curve $G_1$ representing the torque transmitted by the clutch approximates the constant horsepower curve H of the motor and equals it at the two desired operating speeds. Hence, at the operating speeds which have been chosen, equal horsepower is delivered.

It is thus clear that the applicant has provided a clutch having highly improved operating characteristics which are of particular utility in conjunction with automatic washer assemblies, and especially those utilizing a two-speed spin cycle.

While particular embodiments of this invention have been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. A clutch mechanism, including, in combination, a driving means rotatable in either a forward or a reverse direction and arranged to be accelerated from a low speed to either a first operating speed or a second, substantially higher operating speed, a driven means including a torque-transmitting drum including a cylindrical wall coaxial with said driving means for rotation relative thereto, a clutch member pivotally mounted on said driving means within the area thereof encompassed by said drum wall, said member having an arcuate end portion in adjacent facing relation to said drum wall, a centrifugal member rotatably mounted on said driving means, said centrifugal member being eccentrically weighted for centrifugally-induced rotation upon rotation of said driving means, a yoke mounted on said driving means in coaxial relation thereto, means including a pin and slot engagement between said yoke and said centrifugal member, said slot having a portion substantially concentric with said centrifugal member and being of a length permitting rotation of said centrifugal member between a first position representative of a low rotational speed of said driving means in one direction and a second position representative of a throw-out speed of said driving means relatively close to but below said lower operating speed, and a spring resiliently coupling said clutch member and said centrifugal member whereby said clutch member is normally out of torque-transmitting engagement with said drum wall and centrifugally-induced rotation of said centrifugal member rotates said clutch member to engage the arcuate wall thereof against said drum wall, the respective members being so mutually related and the clutch member being positioned relative to said drum wall that when said centrifugal member is intermediate its said first and second positions the arcuate wall portion of said clutch member is in frictional driving engagement with said drum wall and continued rotation of said centrifugal member to its said second position elongates said spring to increase the frictional engagement of said clutch member with said drum wall until at the throw-out speed position of said centrifugal member said spring attains maximum tension to establish maximum torque-transmitting engagement between said clutch member and said drum wall; the force gradient of said spring with changing elongation thereof being larger than the centrifugal force gradient of said centrifugal member with the changing radius of the center of gravity thereof relative to said driving means axis, whereby to effect at said throw-out speed a sharp transition between the speed-dependent torque as determined by centrifugal force on said centrifugal member and constant torque as determined by the said maximum tension of said spring.

2. A clutch mechanism according to claim 1, in which said pin and slot mechanism includes a slot portion accepting said pin upon reverse rotation of said driving means to secure said centrifugal member in its first named position, and structure engaging between said clutch member and said centrifugal member to preclude rotation of the clutch member into torque-transmitting position while said centrifugal member is in its said first position.

References Cited in the file of this patent

UNITED STATES PATENTS

| | | |
|---|---|---|
| 2,318,433 | Stechbart | May 4, 1943 |
| 2,392,950 | Russell | Jan. 15, 1946 |
| 2,762,483 | Clark | Sept. 11, 1956 |
| 2,782,893 | Chapman | Feb. 26, 1957 |
| 2,823,779 | Johnson et al. | Feb. 18, 1958 |

FOREIGN PATENTS

| | | |
|---|---|---|
| 310,941 | Germany | Feb. 26, 1919 |